United States Patent
Khan

(10) Patent No.: US 9,336,202 B2
(45) Date of Patent: May 10, 2016

(54) METHOD AND SYSTEM RELATING TO SALIENT CONTENT EXTRACTION FOR ELECTRONIC CONTENT

(71) Applicant: Whyz Technologies Limited, Ottawa (CA)

(72) Inventor: Shahzad Khan, Ottawa (CA)

(73) Assignee: Whyz Technologies Limited, Ottawa, Ontario (CA)

( * ) Notice: Subject to any disclaimer, the term of this patent is extended or adjusted under 35 U.S.C. 154(b) by 300 days.

(21) Appl. No.: 13/753,645

(22) Filed: Jan. 30, 2013

(65) Prior Publication Data
US 2013/0311169 A1    Nov. 21, 2013

Related U.S. Application Data

(60) Provisional application No. 61/647,183, filed on May 15, 2012.

(51) Int. Cl.
*G06F 17/27* (2006.01)
*G06F 17/30* (2006.01)
*G06F 17/28* (2006.01)

(52) U.S. Cl.
CPC ...... *G06F 17/2785* (2013.01); *G06F 17/30684* (2013.01); *G06F 17/30699* (2013.01); *G06F 17/30707* (2013.01); *G06F 17/274* (2013.01); *G06F 17/289* (2013.01)

(58) Field of Classification Search
USPC ........................................... 704/9, 10, 2, 4, 7
See application file for complete search history.

(56) References Cited

U.S. PATENT DOCUMENTS

| | | | |
|---|---|---|---|
| 7,475,010 B2 * | 1/2009 | Chao | 704/10 |
| 8,533,208 B2 * | 9/2013 | Sundaresan et al. | 707/755 |
| 2007/0061758 A1 * | 3/2007 | Manson et al. | 715/853 |
| 2008/0243480 A1 * | 10/2008 | Bartz et al. | 704/9 |
| 2010/0153094 A1 * | 6/2010 | Lee et al. | 704/9 |

* cited by examiner

*Primary Examiner* — Vu B Hang
(74) *Attorney, Agent, or Firm* — Rosenberg, Klein & Lee

(57) ABSTRACT

Individuals receive overwhelming barrage of information which must be filtered, processed, analyzed, reviewed, consolidated and distributed or acted upon. Automatic approaches to "scraping" salient content from sources of content are provided allowing the salient content to be provided to the user or subjected to further processing such as clustering or sentiment analysis for example.
Embodiments of the invention provide for:
automated scraper induction based on document and/or contextual semantic cues and document structure analysis.
identifying salient text, removing boiler-plate text, off-topic content and other non-salient content;
deriving reusable descriptive extraction patterns for subsequent documents;
applying descriptive extraction patterns for extraction from subsequent documents from the same source;
intelligent identification of extraction success confidence score, using historical success scores; and
employing confidence scores to automatically trigger new extraction pattern identification if extracted confidence is below an acceptable confidence threshold.

8 Claims, 7 Drawing Sheets

METHOD AND SYSTEM RELATING TO SALIENT CONTENT EXTRACTION FOR ELECTRONIC CONTENT

CROSS-REFERENCE TO RELATED APPLICATIONS

This patent application claims the benefit of U.S. Provisional Patent Application 61/647,183 filed May 15, 2012 entitled "Method and System of Managing Content" the entire contents of which are incorporated by reference.

FIELD OF THE INVENTION

The present invention relates to published content and more specifically to the processing of published content for users extract the core text and/or salient text.

BACKGROUND OF THE INVENTION

In 2008, Americans consumed information for approximately 1.3 trillion hours, or an average of almost 12 hours per day per person (Global Information Industry Center, University of California at San Diego, January 2010). Consumption totaled 3.6 zettabytes ($3.6 \times 10^{21}$ bytes) and 10,845 trillion ($10,845 \times 10^{12}$) words, corresponding to 100,500 words and 34 gigabytes for an average person on an average day. This information coming from over twenty different sources of information, from newspapers and books through to online media, social media, satellite radio, and Internet video although the traditional media of radio and TV still dominated consumption per day.

Computers and the Internet have had major effects on some aspects of information consumption. In the past, information consumption was overwhelmingly passive, with telephone being the only interactive medium. However, with computers, a full third of words and more than half of digital data are now received interactively. Reading, which was in decline due to the growth of television, tripled from 1980 to 2008, because it is the overwhelmingly preferred way to receive words on the Internet. At the same time portable electronic devices and the Internet have resulted in a large portion of the population in the United States for example becoming active generators of information throughout their daily lives as well as active consumers augmenting their passive consumption. Social media such as Facebook™ and Twitter™, blogs, website comment sections, Bing™ Yahoo™ have all contributed in different ways to the active generation of information by individuals which augments that generated by enterprises, news organizations, Government, and marketing organizations.

Globally the roughly 27 million computer servers active in 2008 processed 9.57 zettabytes of information (Global Information Industry Center, University of California at San Diego, April 2011). This study also estimated that enterprise server workloads are doubling about every two years and whilst a substantial portion of this information is incredibly transient overall the amount of information created, used, and retained is growing steadily.

The exploding growth in stored collections of numbers, images and other data represents one facet of information management for organizations, enterprises, Governments and individuals. However, even what was once considered "mere data" becomes more important when it is actively processed by servers as representing meaningful information delivered for an ever-increasing number of uses. Overall the 27 million computer servers were estimated as providing an average of 3 terabytes of information per year to each of the estimated 3.18 billion workers in the world's labor force.

Increasingly, a corporation's competitiveness hinges on its ability to employ innovative search techniques that help users discover data and obtain useful results. In some instances automatically offering recommendations for subsequent searches or extracting related information are beneficial. To gain some insight into the magnitude of the problem consider the following:

- in 2009 around 3.7 million new domains were registered each month and as of June 2011 this had increased to approximately 4.5 million per month;
- approximately 45% of Internet users are under 25;
- there are approximately 600 million wired and 1,200 million wireless broadband subscriptions globally;
- approximately 85% of wireless handsets shipped globally in 2011 included a web browser;
- there are approximately 2.1 billion Internet users globally with approximately 2.4 billion social networking accounts;
- there are approximately 800 million users on Facebook™ and approximately 225 million Twitter™ accounts;
- there are approximately 250 million tweets per day and approximately 250 million Facebook activities;
- there are approximately 3 billion Google™ searches and 300 million Yahoo™ searches per day.

Accordingly it would be evident that users face an overwhelming barrage of information (content) that must be filtered, processed, analysed, reviewed, consolidated and distributed or acted upon. For example a market researcher seeking to determine the perception of a particular product may wish to rapidly collate sentiments from reviews sourced from websites, press articles, and social media. However, existing sentiment filtering approaches simply determine occurrences of a keyword with positive and negative terms. Accordingly content containing the phrase "Last night I drove to see Terminator 3 in my new Fiat 500, after eating at Stonewall's, the truffle bison burger was great" would be interpreted as positive feedback even though the positive term is associated with the food rather than either the film "Terminator 3" or the vehicle "Fiat 500." Accordingly, it would be beneficial for sentiment analysis of content to be contextually aware.

Similarly, a search by a user using the terms "Barack Obama Afghanistan" with Google™ run on May 2, 2012 returns approximately 324 million "hits" in a fraction of a second. These are displayed, by default in the absence of other filters by the user, in an order determined by rules executed by Google™ servers relating to factors including, but not limited to, match to user entered keywords and the number of times a particular webpage or item of content has been opened. However, within this search the same content may be reproduced multiple times in different sources legitimately as well as having been plagiarized partially into other sources as well as the same event being presented through different content on other websites. Accordingly, different occurrences of Barack Obama visiting Afghanistan or different aspects of his visit to Afghanistan may become buried in an overwhelming reporting of his last visit or the repeated occurrence of strategic photo opportunities during the visit during a campaign.

Accordingly, it would be beneficial for the user to be able to retrieve a collection of multiple items of content, commonly referred to as documents, which mention one or more concepts or interests, and automatically cluster them into cohesive groups that relate to the same concepts or interests. Each cohesive group (or cluster) formed thereby consists of one or more documents from the original collection which describe the same concept or interest even where the documents have perhaps a different vocabulary. Even when a user identifies an item of content of interest, for example a review of a product, then the salient text may be buried within a large amount of other content or alternatively the item of content may be formatted for display upon laptops, tablet PCs, etc. whereas the user is accessing the content on a portable electronic device such as a smartphone or portable gaming console for example.

Accordingly it would be beneficial for the user to be able to access the salient text contained in one or more items of content, based on learned semantic and content structure cues so that extraneous elements of the item of content are removed. Accordingly it would be beneficial to provide a tool for inducing content scraping automatically to filter content to that necessary or automatically extracting core text for viewing on constrained screen devices or vocalizing through a screen reader. Automated summarization or text simplification may also form extensions of the scraper.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to provide improvements in the art relating to published content and more specifically to the processing of published content for users to associate sentiment to content, cluster content for review, and extract core text.

In accordance with an embodiment of the invention there is provided a method comprising:
a) receiving an item of content;
b) identifying within the item of content using a microprocessor a set of lexical pattern cues for core content of the item of content and selecting a segment of the item of content having a highest likelihood as being the core content based upon a structural analysis of the item of content in dependence upon at least the set of lexical pattern cues;
c) parsing the item of content to generate a hierarchy of content within the item of content;
d) ranking the hierarchy of content in dependence upon at least the lexical pattern cues and sorting the resulting ranking;
e) identifying a gap when searching down the ranking meeting a predetermined threshold and removing those portions of the hierarchy of content below the gap to generate truncated content;
f) find all occurrences for portions of the hierarchy of content with closest match to the lexical pattern cues closest to the start of the item of content;
g) determining whether multiple matches to the lexical pattern cues exist and establishing an action in dependence upon at least whether multiple matches exist or not;
h) performing the action, wherein the action is at least one of: establishing the occurrence for the portion of the hierarchy of content as the core content of the item of content when the determination of multiple matches is negative; and establishing the occurrence for the portion of the hierarchy of content that at least one of contains the largest portion of the item of content and is the first occurrence as the core content of the item of content when the determination of multiple matches is positive.

In accordance with an embodiment of the invention there is provided a method comprising:
a) receiving an item of content;
b) identifying within the item of content using a microprocessor a set of lexical pattern cues for core content of the item of content;
c) parsing the item of content to generate a hierarchy of content within the item of content;
d) searching within a first database for a match to a predetermined portion of the hierarchy of content of an entry within the database, the first database comprising entries relating to hierarchies of content previously established for other items of content together with associations to the items of content they relate to;
e) where a match is determined calculating a density factor in dependence upon at least the contents of the identified hierarchy of content within the database and the set of lexical pattern cues;
f) if the calculated density factor exceeds a predetermined threshold adding a predetermined count to a counter associated with the identified hierarchy of content stored within a second database;
g) extracting from the item of content using the identified hierarchy of content truncated content of the item of content.

In accordance with an embodiment of the invention there is provided a method comprising:
a) establishing on a computer system comprising at least a microprocessor at least one lexical pattern cue of a plurality of lexical pattern cues;
b) receiving on the computer system an item of content;
c) processing on the computer system the item of content to establish a set of rankings, each ranking established in dependence upon at least the plurality of lexical pattern cues for a portion of the item of content; and
d) generating a new item of content in dependence upon at least the item of content and the set of rankings of the plurality of lexical pattern cues when a ranking within the set of rankings exceeds a predetermined threshold.

In accordance with an embodiment of the invention there is provided a method comprising:
receiving on a computer system an item of content accessed from a remote computer server to which the computer is connected via a network;
executing a lookup mechanism to identify the existence of one or more descriptive extraction patterns associated with the remote computer server;
parsing the item of content to generate a hierarchy of content within the item of content; applying a descriptive extraction pattern to extract one or more portions of the hierarchy of content; and
extracting the final text based on the extracted portions of the hierarchy of content.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1A:
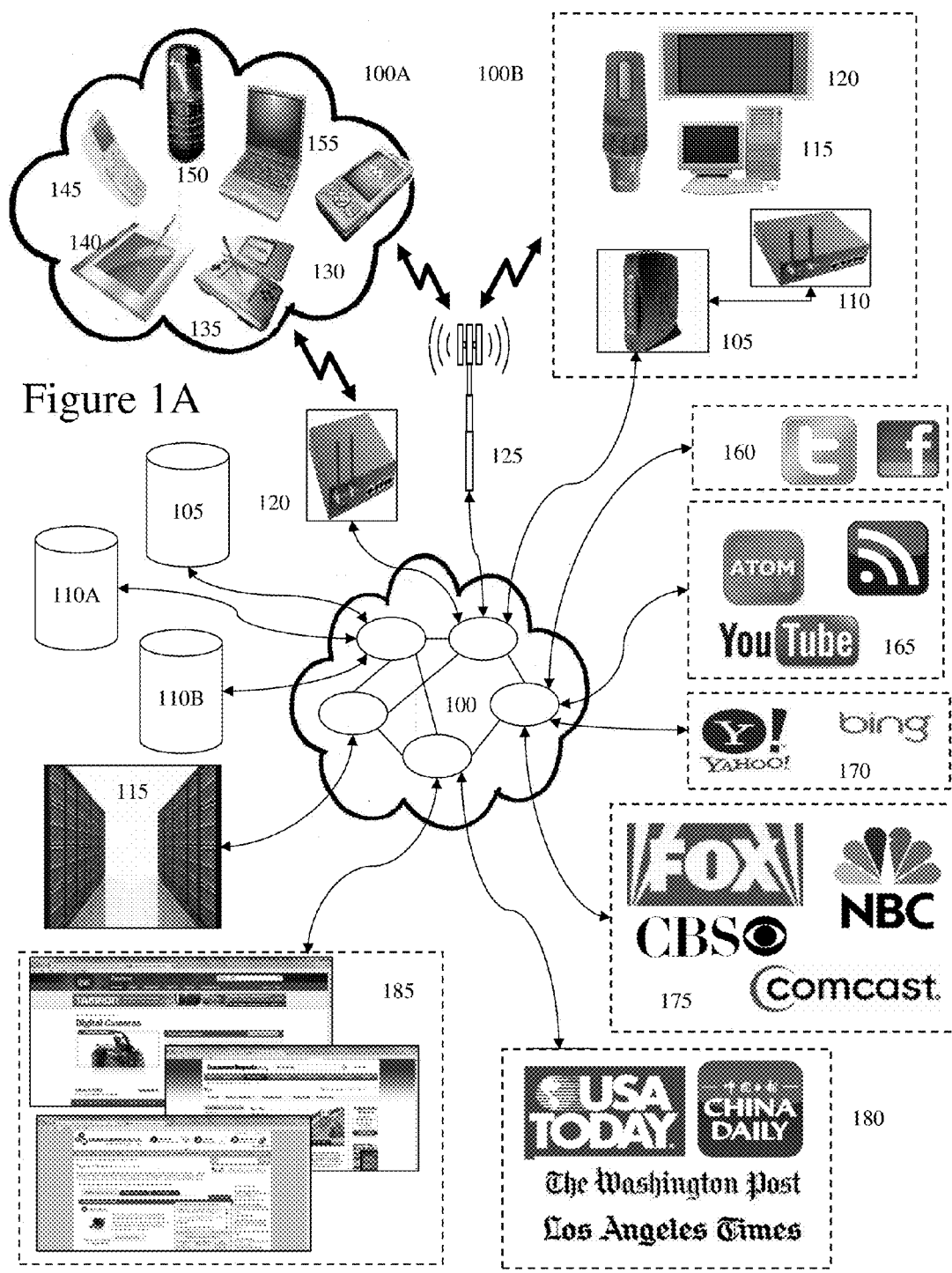
FIG. 1A depicts a network accessible by a user and content sources accessible to the user with respect to embodiments of the invention.

The present invention is directed to published content and more specifically to the processing of published content for users to associate sentiment to content, cluster content for review, and extract core text.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for electronic communications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader. A "fixed electronic device" (FED) as used herein and throughout this disclosure, refers to a wired or wireless device used for electronic communications that may be dependent upon a fixed source of power, employ a battery or other independent form of energy for power. This includes devices, but is not limited to, such as a portable computer, personal computer, Internet enabled display, gaming console, computer server, kiosk, and a terminal.

A "network operator/service provider" as used herein may refer to, but is not limited to, a telephone or other company that provides services for mobile phone subscribers including voice, text, and Internet; telephone or other company that provides services for subscribers including but not limited to voice, text, Voice-over-IP, and Internet; a telephone, cable or other company that provides wireless access to local area, metropolitan area, and long-haul networks for data, text, Internet, and other traffic or communication sessions; etc.

"Content", "input content" and/or "document" as used herein and through this disclosure refers to an item or items of information stored electronically and accessible to a user for retrieval or viewing. This includes, but is not limited to, documents, images, spreadsheets, databases, audiovisual data, multimedia data, encrypted data, SMS messages, social media data, data formatted according to a markup language, and information formatted according to a portable document format.

A "web browser" as used herein and through this disclosure refers to a software application for retrieving, presenting, and traversing information resources on the World Wide Web identified by a Uniform Resource Identifier (URI) and may be a web page, image, video, or other piece of content. The web browser also allows a user to access and implement hyperlinks present in accessed resources to navigate their browsers to related resources. A web browser may also be defined within the scope of this specification as an application software or program designed to enable users to access, retrieve and view documents and other resources on the Internet as well as access information provided by web servers in private networks or files in file systems.

An "application" as used herein and through this disclosure refers to a software application, also known as an "app", which is computer software designed to help the user to perform specific tasks. This includes, but is not limited to, web browser, enterprise software, accounting software, information work software, content access software, education software, media development software, office suites, presentation software, work processing software, spreadsheets, graphics software, email and blog client software, personal information systems and desktop publishing software. Many application programs deal principally with multimedia, documentation, and/or audiovisual content in conjunction with a markup language for annotating a document in a way that is syntactically distinguishable from the content. Applications may be bundled with the computer and its system software, or may be published separately.

A "user," as used herein and through this disclosure refers to, but is not limited to, a person or device that generates, receives, analyses, or otherwise accesses content stored electronically within a portable electronic device, fixed electronic device, network accessible server, or other source storing content.

A "server" as used herein and through this disclosure refers to a computer program running to serve the requests of other programs, the "clients". Thus, the "server" performs some computational task on behalf of "clients" which may either run on the same computer or connect through a network. Accordingly such "clients" therefore being applications in execution by one or more users on their PED/FED or remotely at a server. Such a server may be one or more physical computers dedicated to running one or more services as a host. Examples of a server include, but are not limited to, database server, file server, mail server, print server, and web server.

Referring to FIG. 1A there is depicted a network supporting communications and interactions between devices connected to the network and executing functionalities according to embodiments of the invention with a first and second user groups 100A and 1000B respectively to a telecommunications network 100. Within the representative telecommunication architecture a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The remote central exchange 180 is connected via the network 100 to local, regional, and international exchanges (not shown for clarity) and therein through network 100 to first and second wireless access points (AP) 120 and 110 respectively which provide Wi-Fi cells for first and second user groups 100A and 100B respectively.

Within the cell associated with first AP 120 the first group of users 100A may employ a variety of portable electronic devices (PEDs) including for example, laptop computer 155, portable gaming console 135, tablet computer 140, smartphone 150, cellular telephone 145 as well as portable multimedia player 130. Within the cell associated with second AP 110 the second group of users 100B may employ a variety of portable electronic devices (not shown for clarity) but may also employ a variety of fixed electronic devices (FEDs) including for example gaming console 125, personal computer 115 and wireless/Internet enabled television 120 as well as cable modem 105 which links second AP 110 to the network 100.

Also connected to the network 100 is cell tower 125 that provides, for example, cellular GSM (Global System for Mobile Communications) telephony services as well as 3G and 4G evolved services with enhanced data transport support. Cell tower 125 provides coverage in the exemplary embodiment to first and second user groups 100A and 100B. Alternatively the first and second user groups 100A and 100B may be geographically disparate and access the network 100 through multiple cell towers, not shown for clarity, distributed geographically by the network operator or operators. Accordingly, the first and second user groups 100A and 100B may according to their particular communications interfaces communicate to the network 100 through one or more communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOW and Internet access.

Also communicated to the network 100 are first and second servers 110A and 110B respectively which host according to embodiments of the invention multiple services associated with content from one or more sources including for example, but not limited to:
  social media 160 such as Facebook™, Twitter™, LinkedIn™ etc;
  web feeds 165 such as formatted according to RSS and/or Atom formats to publish frequently updated works;
  web portals 170 such as Yahoo™, Google™, Baidu™, and Microsoft's Bing™ for example;
  broadcasters 175 including Fox, NBC, CBS, and Comcast for example who provide content via multiple media including for example satellite, cable, and Internet;
  print media 180 including for example USA Today, Washington Post, Ls Angeles Times and China Daily;
  websites 185 including, but not limited to, manufacturers, market research, consumer research, newspapers, journals, and financial institutions.

Also connected to network 100 is application server 105 which provides software system(s) and software application(s) associated with receiving retrieved content and processing said published content for users to associate sentiment to content, cluster content for review, and extract core text as discussed below in respect of embodiments of the invention. First and second servers 110A and 110B and application server 105 together with other servers not shown for clarity may also provided dictionaries, speech recognition software, product databases, inventory management databases, retail pricing databases, shipping databases, customer databases, software applications for download to fixed and portable electronic devices, as well as Internet services such as a search engine, financial services, third party applications, directories, mail, mapping, social media, news, user groups, and other Internet based services.

Figure 1B:
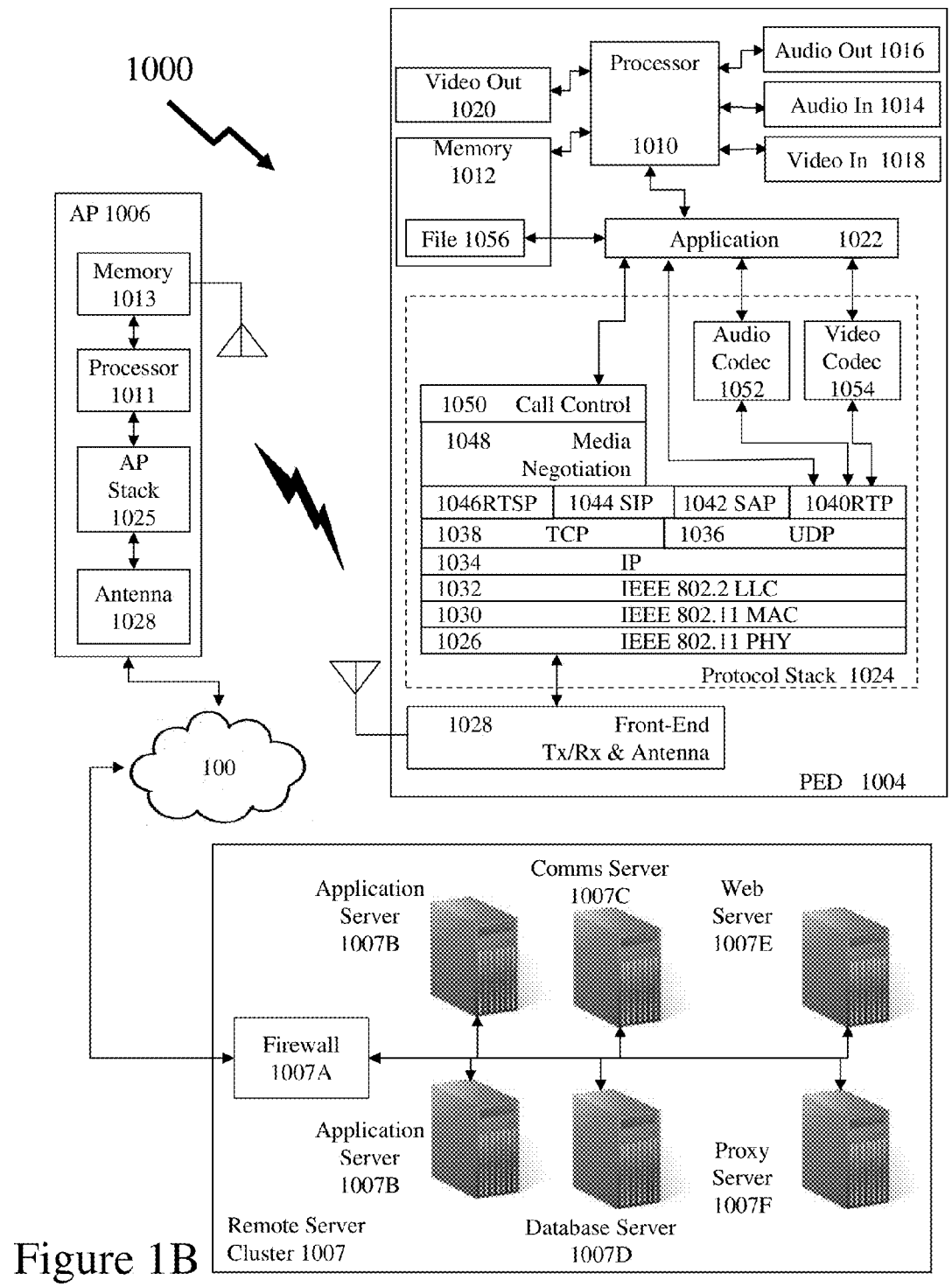
FIG. 1B depicts an electronic device supporting communications and interactions for a user according to embodiments of the invention

Referring to FIG. 1B there is depicted an electronic device 1004, supporting communications and interactions according to embodiments of the invention with local and/or remote services. Electronic device 1004 may be for example a PED, FED, a terminal, or a kiosk. Also depicted within the electronic device 1004 is the protocol architecture as part of a simplified functional diagram of a system 1000 that includes an electronic device 1004, such as a smartphone 155, an access point (AP) 1006, such as first Wi-Fi AP 110, and one or more remote servers 1007, such as communication servers, streaming media servers, and routers for example such as first and second servers 110A and 110B respectively. Remote server cluster 1007 may be coupled to AP 1006 via any combination of networks, wired, wireless and/or optical communication links such as discussed above in respect of FIG. 1. The electronic device 1004 includes one or more processors 1010 and a memory 1012 coupled to processor(s) 1010. AP 1006 also includes one or more processors 1011 and a memory 1013 coupled to processor(s) 1011. A non-exhaustive list of examples for any of processors 1010 and 1011 includes a central processing unit (CPU), a digital signal processor (DSP), a reduced instruction set computer (RISC), a complex instruction set computer (CISC) and the like. Furthermore, any of processors 1010 and 1011 may be part of application specific integrated circuits (ASICs) or may be a part of application specific standard products (ASSPs). A non-exhaustive list of examples for memories 1012 and 1013 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 1004 may include an audio input element 1014, for example a microphone, and an audio output element 1016, for example, a speaker, coupled to any of processors 1010. Electronic device 1004 may include a video input element 1018, for example, a video camera, and a video output element 1020, for example an LCD display, coupled to any of processors 1010. Electronic device 1004 includes one or more applications 1022 that are typically stored in memory 1012 and are executable by any combination of processors 1010. Electronic device 1004 includes a protocol stack 1024 and AP 1006 includes a communication stack 1025. Within system 1000 protocol stack 1024 is shown as IEEE 802.11 protocol stack but alternatively may exploit other protocol stacks such as an Internet Engineering Task Force (IETF) multimedia protocol stack for example. Likewise AP stack 1025 exploits a protocol stack but is not expanded for clarity. Elements of protocol stack 1024 and AP stack 1025 may be implemented in any combination of software, firmware and/or hardware. Protocol stack 1024 includes an IEEE 802.11-compatible PHY module 1026 that is coupled to one or more Front-End Tx/Rx & Antenna 1028, an IEEE 802.11-compatible MAC module 1030 coupled to an IEEE 802.2-compatible LLC module 1032. Protocol stack 1024 includes a network layer IP module 1034, a transport layer User Datagram Protocol (UDP) module 1036 and a transport layer Transmission Control Protocol (TCP) module 1038.

Protocol stack 1024 also includes a session layer Real Time Transport Protocol (RTP) module 1040, a Session Announcement Protocol (SAP) module 1042, a Session Initiation Protocol (SIP) module 1044 and a Real Time Streaming Protocol (RTSP) module 1046. Protocol stack 1024 includes a presentation layer media negotiation module 1048, a call control module 1050, one or more audio codecs 1052 and one or more video codecs 1054. Applications 1022 may be able to create maintain and/or terminate communication sessions with any of remote servers 1007 by way of AP 1006. Typically, applications 1022 may activate any of the SAP, SIP, RTSP, media negotiation and call control modules for that purpose. Typically, information may propagate from the SAP, SIP, RTSP, media negotiation and call control modules to PHY module 1026 through TCP module 1038, IP module 1034, LLC module 1032 and MAC module 1030.

It would be apparent to one skilled in the art that elements of the PED 1004 may also be implemented within the AP 1006 including but not limited to one or more elements of the protocol stack 1024, including for example an IEEE 802.11-compatible PHY module, an IEEE 802.11-compatible MAC module, and an IEEE 802.2-compatible LLC module 1032. The AP 1006 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module.

As depicted remote server cluster 1007 comprises a firewall 1007A through which the discrete servers within the remote server cluster 1007 are accessed. Alternatively remote server 1007 may be implemented as multiple discrete independent servers each supporting a predetermined portion of the functionality of remote server cluster 1007. As presented the discrete servers include application servers 1007B dedicated to running certain software applications, communications server 1007C providing a platform for communications networks, database server 1007D providing database services to other computer programs or computers, web server 1007E providing HTTP clients connectivity in order to send commands and receive responses along with content, and proxy server 1007F that acts as an intermediary for requests from clients seeking resources from other servers.

Salient Content Extraction

Automatic Salient Content Determination Process:

Within this section of the specification processes for automatically extracting salient content from a source of content are presented. The goal of these processes being to take a source of content, for example a web site, and to identify the most salient text contained within the source of content, based on learned semantic and content structure cues. Accordingly, embodiments of the invention provide a means of inducing scrapers for web-sites thereby automatically extracting the salient content. According to another embodiment of the invention the salient content extraction technique provides for automatically extracting core text from a source of content allowing it to either be viewed with constrained screen devices, such as for example tablet computers, smartphones, portable gaming consoles and alike or for vocalizing the extracted core content. It would be evident to one skilled in the art that automated summarization or text simplification can be a valuable addition to this web-site text extraction technology.

Figure 2A:
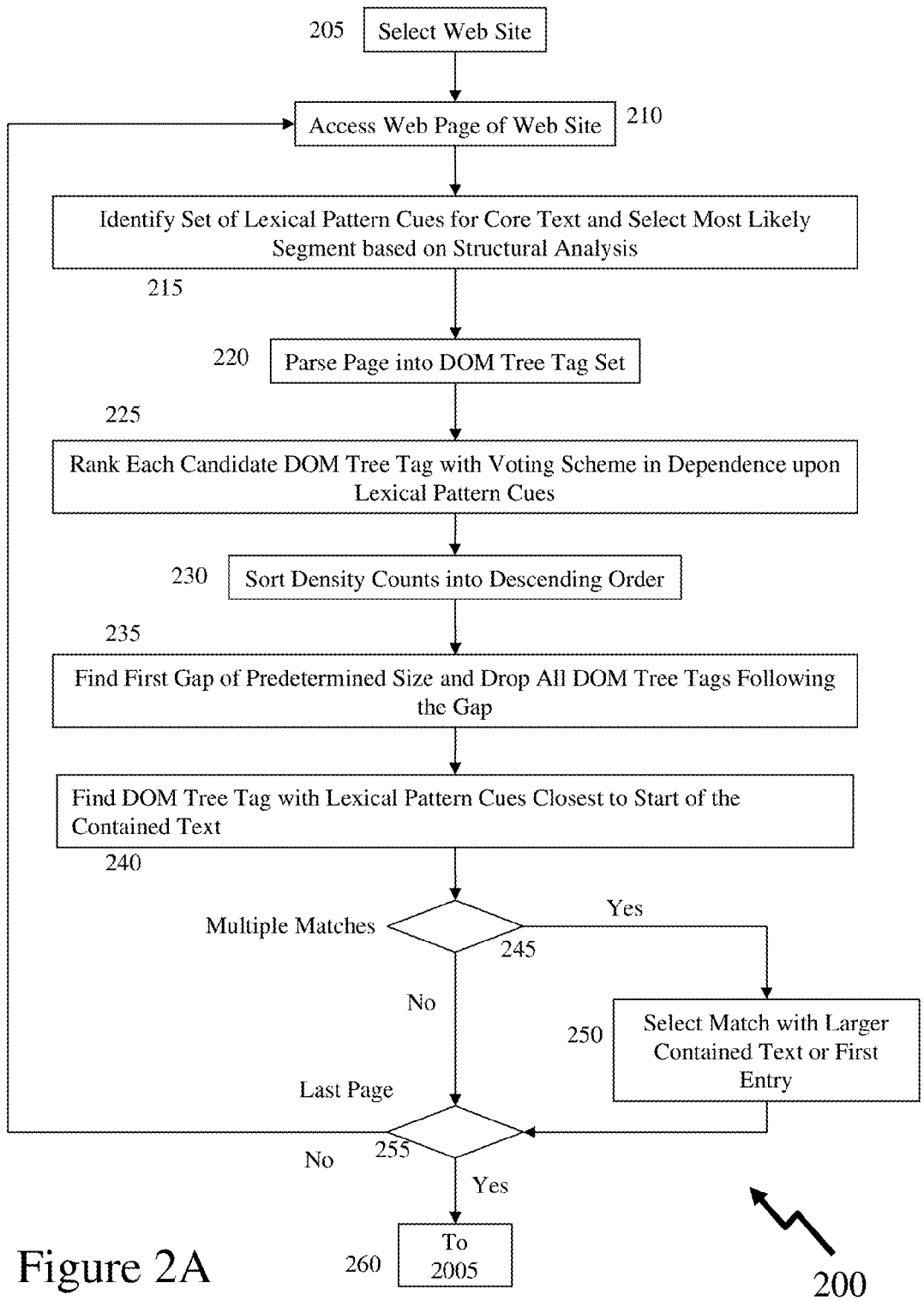
FIGS. 2A and 2B depicts a process flow for inducing scraping of content for identifying and extracting salient text contained within the content according to an embodiment of the invention.
Figure 2B:
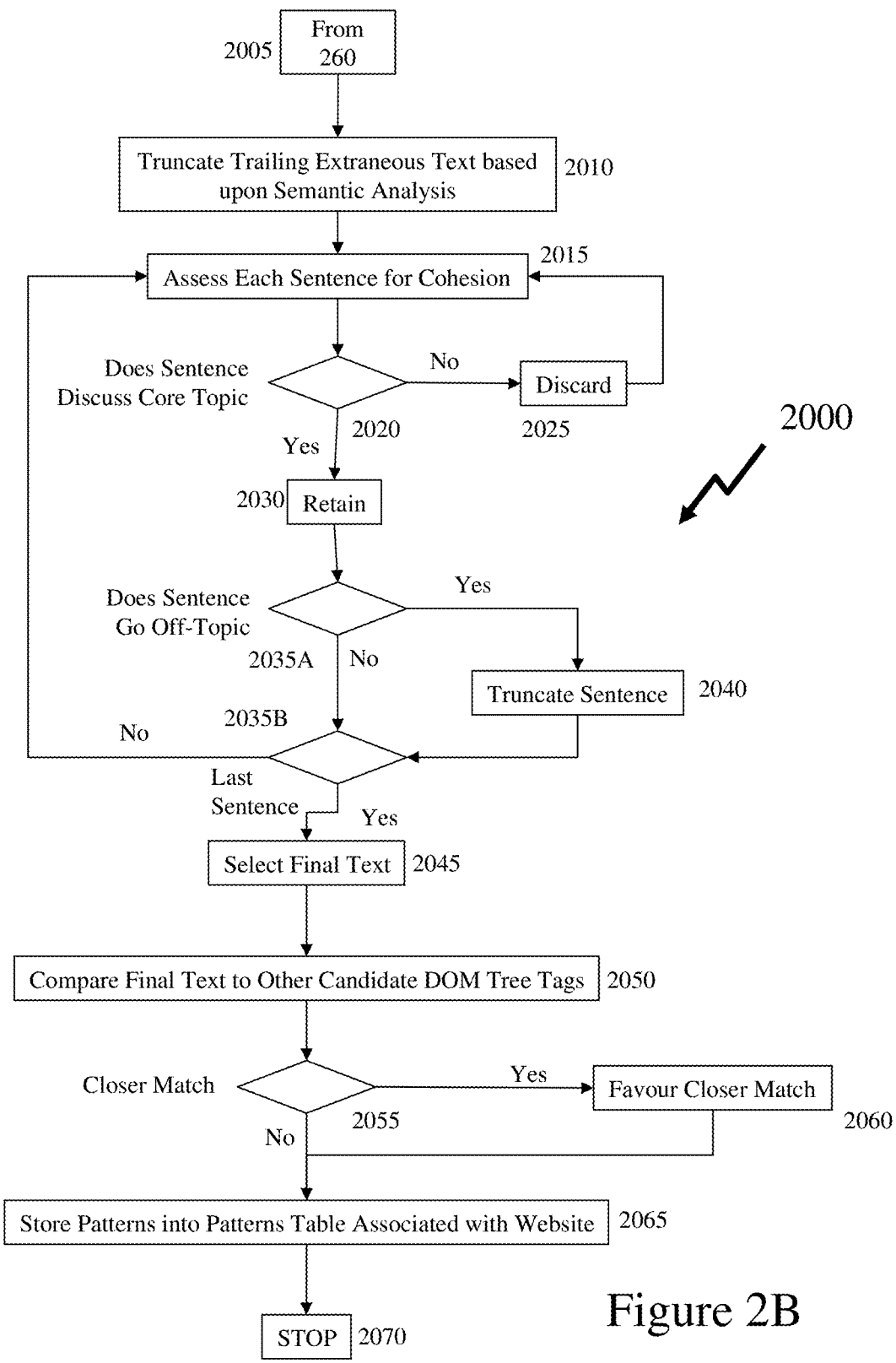

Referring to FIGS. 2A and 2B there are depicted first and second process flowcharts 200 and 2000 respectively. First process flowchart 200 begins with the selection of a web site in step 205 wherein the process then proceeds in step 210 with the selection of a web page. Then in step 215 a set of lexical pattern cues which represent the core text are established using a processing algorithm, which may include, but not be limited to, the following sources:

the description section from an RSS feed that contains the web page Uniform Resource Locator (URL);

the contents of the title tag of the page;

text contained in a paragraph surrounding a link to the web page; and text contained in an <A> tag linking to the web page.

In an alternative embodiment of the invention the most frequent content terms remaining once all HTML tags, scripts and other extraneous presentation markup language have been stripped out are used to establish core content. The content terms do not contain adverbs, prepositions or other "stop words". Based upon whichever analysis is selected or programmed the most likely segment of the web page is selected based upon this structural analysis. Next in step 220 the web page is parsed into a set of Document Object Model (DOM) tree tags such that for example a third division within the web page denoted through use of the <div> or </div> tags may be labeled as Document→Body→DIV (3).

Next in step 225 each candidate tree tag is ranked for density based upon, for example, a voting scheme using the "lexical pattern cues" so that the ranking is based upon the text contained in this DOM-tree tag. The content-density, $C_\rho$ is defined by Equation (1) below according to one embodiment of the invention, wherein these rankings are then sorted in step 230 into descending order. Next in step 235 the process searches for the first large gap in the content-density rankings and deletes all DOM-tree tags from candidature that follow this gap. In step 240 of the remaining DOM-tree tags the one that has the "lexical pattern cues" matching closest to the start of the contained text, e.g. the content of the website, is selected. In the event that multiple DOM-tree tags having "lexical pattern cues" fulfilling this requirement are identified as present in step 245 the process proceeds to step 250 and selects the one with the largest contained text or the first entry before proceeding to step 255 wherein the process similarly routes if only one DOM-tree tag was identified as having "lexical pattern cues" fulfilling the requirement.

$$C_\rho = \frac{N_{CUE}}{L_{TEXT}} \quad (1)$$

where $N_{CUE}$ is the number of occurrences of the "lexical pattern cues" and $L_{TEXT}$ the length of the text contained in the DOM-tree tag. In step 255 the process determines whether further web pages should be accessed and retrieved. The number of web pages being retrieved may be predetermined, e.g. two, or dynamically established in dependence upon one or more factors including, but not limited to, indicated number of pages relating to "topic", web site, results of first web page, and user entry. At this point if all web pages have been processed the process proceeds to step 2105 in the second process flowchart 2000.

Now referring to second process flowchart 2000 in FIG. 2B the process begins with step 2005 wherein the process begins upon completion of the first process flowchart 200. From step 2005 the process proceeds to step 2010 wherein trailing extraneous text determined from a semantic analysis is truncated. Next in step 2015 the process identifies those content terms that are most closely associated with "lexical pattern cues" within the extracted text and each sentence is assessed/evaluated for cohesion. In step 2020 if it is determined that the sentence discusses the core topic of the article, based upon the instances of "lexical pattern cues" or closely associated content terms. If no then the process proceeds to step 2025 and discards the sentence before looping back round to step 2015 for the next sentence in the extracted text. If the text is to be retained the process proceeds to step 2030 and is retained before in step 2035A it is determined whether the sentence goes off-topic. If yes then the process truncates at the determined point of going off-topic in step 2040 and the process proceeds to step 2035B, and if no then the process proceeds directly to step 2035B.

In step 2035B the process determines if other sentences remain to be processed wherein a positive response results in the process looping back to step 2015 otherwise it proceeds to step 2045 wherein the final text is compiled from the retained complete and truncated sentences. Then in step 2050 the process compares the final text to content from other candidate DOM-tree tags to see if a closer match is found. If yes then the process proceeds to step 2060 and favours the closer match before proceeding to step 2065, and if no then the process proceeds directly to step 2065 wherein the patterns determined from determining the sentences and final text are stored into a PATTERNS table associated with this website before the process proceeds to step 2070 and terminates.

Figure 2C:
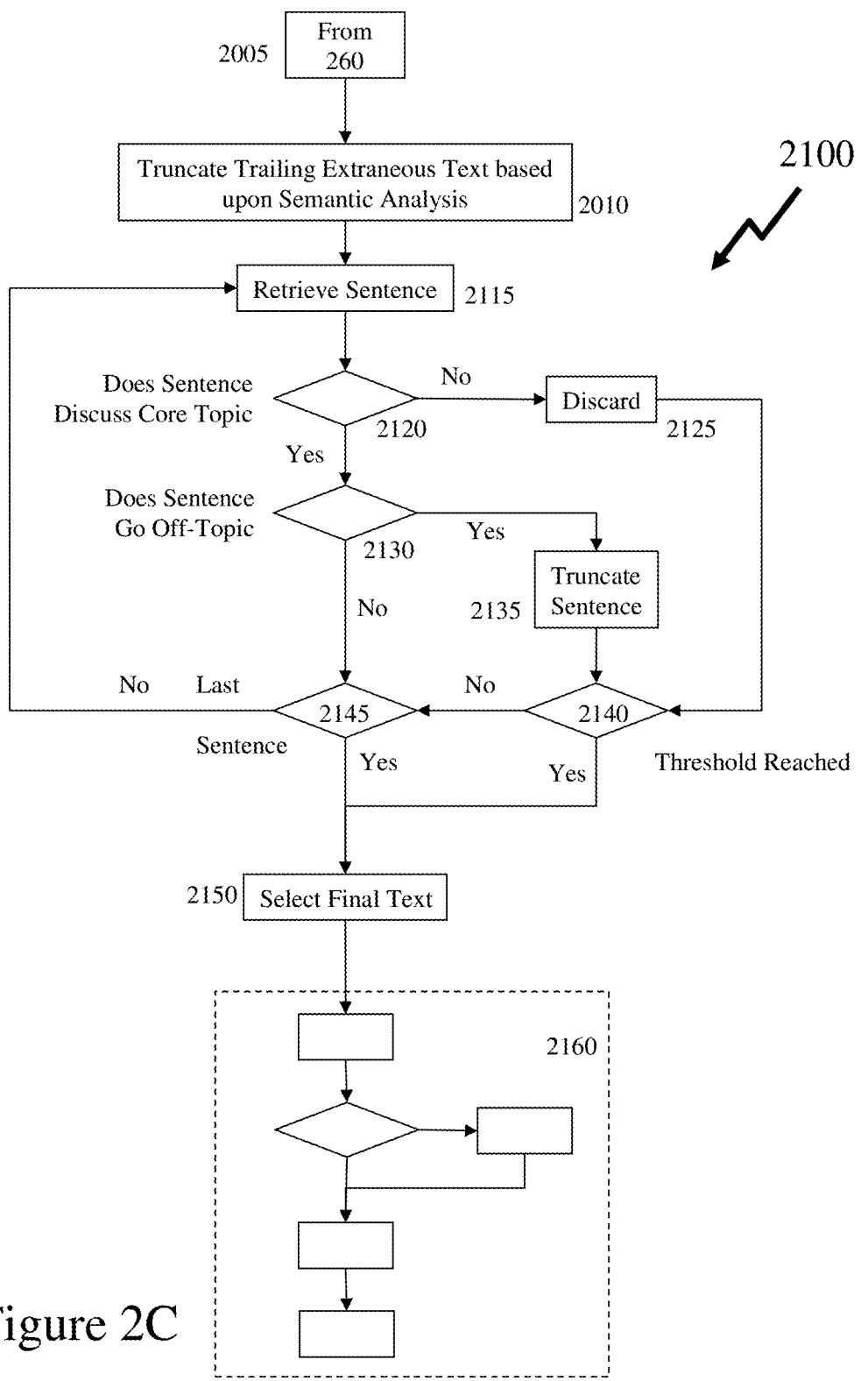
FIG. 2C depicts a process flow for truncating scraped content according to an embodiment of the invention.

Referring to FIG. 2C there is depicted a process flow 2100 wherein scraped content from a source is truncated according to an embodiment of the invention. As depicted the process begins with steps 2005 and 2010 as described above in respect of process flow 2000 in FIG. 2B wherein upon completion of the first process flowchart 200 the process proceeds to truncate trailing extraneous text which has been determined from a semantic analysis. Next in step 2115 the process retrieves a sentence from the scraped content and determines in step 2120 whether the sentence discusses the core topic or not wherein a positive determination results in the process proceeding to step 2130 otherwise the process proceeds to step 2140 having discarded the sentence in step 2125. In step 2130 the process determines whether the sentence goes off topic wherein a negative determination results in the process proceeding to step 2145 otherwise the process proceeds to step 2140 via step 2135 wherein the sentence is truncated. At step 2145 the process checks to determine if the sentence is the last one within the scraped content wherein if not the process loops back to step 2120 otherwise it proceeds to step 2150 and selects the final text from the sentences stored through the proceeding portion of the process which have or have not been truncated but have been determined as relating to the topic.

In step 2140 the process checks to determine whether a threshold of discarded or truncated sentences has been reached. If not then the process proceeds to step 2145 and checks for whether the end of the scraped content has been reached. If the threshold has been reached then the process determines that the scraped content overall has gone off topic to sufficient degree to not warrant checking remaining scraped content and proceeds to step 2150 wherein the final text is compiled as discussed supra. Subsequently the process proceeds to sub-process flow 2060 which comprises steps 2050 through 2070 of process 2000 in FIG. 2B wherein it is determined whether more suitable scraped content exists and determines to maintain the currently generated final text or replace it with a more appropriate section of the scraped content.

Optionally the establishment of the patterns for a particular element of extracted core text may be determined based upon other processes including, for example, multi-page voting. Accordingly the extracted and processed text extracted from the web page(s) is now salient, without extraneous content or non-core topic content, and in a format allowing a user to absorb the core content with increased ease. Further, a web page which originally contained significant extraneous and non-core content is now reduced to a text block. Accordingly it would be evident that the reduced complexity salient content may now be displayed upon electronic devices with reduced display capabilities, for example a pager or cellular phone rather than a tablet computer or smartphone, or in instances with reduced data connectivity to the network, such that instances of low speed connectivity trigger salient content extraction even on electronic devices with significant display capabilities such as laptop computers, tablet computers, and smartphones. Alternatively, such salient content extraction may be employed to reduce the overall data transmission requirements thereby reducing the "hit" of a web page to a user's data usage plan with their carrier. Similarly, the extracted text may be embedded into an email, SMS or other electronic communication means allowing the user to forward the salient content to other users or themselves for subsequent recall and/or use.

Figure 3:
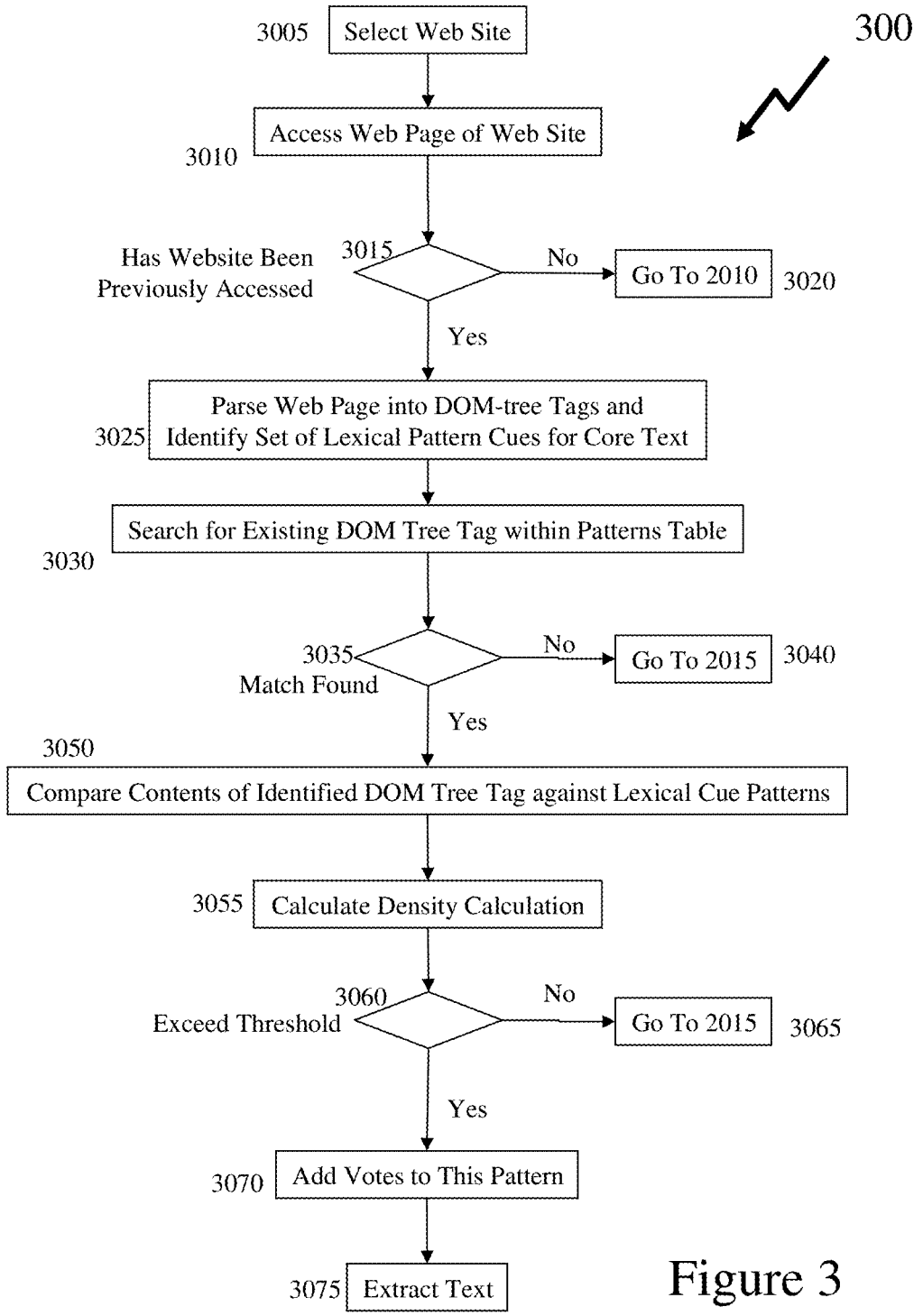
FIG. 3 depicts a process flow for recalling and applying a stored web scraper according to an embodiment of the invention.

Now referring to FIG. 3 there is presented a process flowchart 300 according to an embodiment of the invention relating to accessing a web site with a salient content extraction application in execution upon the user's electronic device. Accordingly in step 3005 a web site is accessed and a page within the web site accessed in step 3010 wherein in step 3015 the process determines whether the website and/or web page have been previously accessed. A negative determine directs the process to step 3020 wherein the software system and/or software application then directs to step 2005 of first process flow 200 in FIG. 2A. A positive determination results in the process proceeding to step 3025 wherein the web page is parsed into DOM-tree tags and then the set of "lexical pattern cues" for the web page are extracted such as described previously in respect of first process flow 200 in FIG. 2A.

In step 3030 a search within the PATTERNS table is made to see if an existing DOM-tree tag pattern is found wherein a negative determination of this result in step 3035 passes the process to step 3040 and thereafter to step 2015 within first process flowchart 200 in FIG. 2A. A positive determination results in the process proceeding to step 3050 wherein the contents of identified DOM-tree tag are compared against the "lexical pattern cues" determined in step 3025 and a density calculation performed in step 3055 for instances of the contents of the identified DOM-tree tag within the "lexical pattern cues" and/or web page contents. In step 3060 this density result is compared to threshold wherein if the density is below the threshold the process proceeds to step 3065 and thereafter to step 2015 in first process flow 200 in FIG. 2A. If the density calculation is above the threshold the process proceeds to step 3070, adds a predetermined number of votes to this pattern, and then in step 3075 extracts the text.

It would be evident that whilst salient content extraction has been discussed supra in respect of FIGS. 2A through 3 with respect to web pages that the approach is applicable to other forms of content wherein extraneous information may be removed to provide a reduced focussed set of content to present to the user by extracting only the salient content. It would also be evident that the according to other embodiments of the invention that other software systems and/or software applications may exploit a "scraper" such as presented supra in respect of FIGS. 2A through 3 in order to extract salient content for further processing, archival, etc. For example extracted salient content from a website may be processed for sentiment analysis such as described above in respect of FIG. 3 or 4 or for clustering such that the information retained in the multi-document clustering process such as presented above in respect of FIGS. 5A and 5B is reduced.

Figure 4:
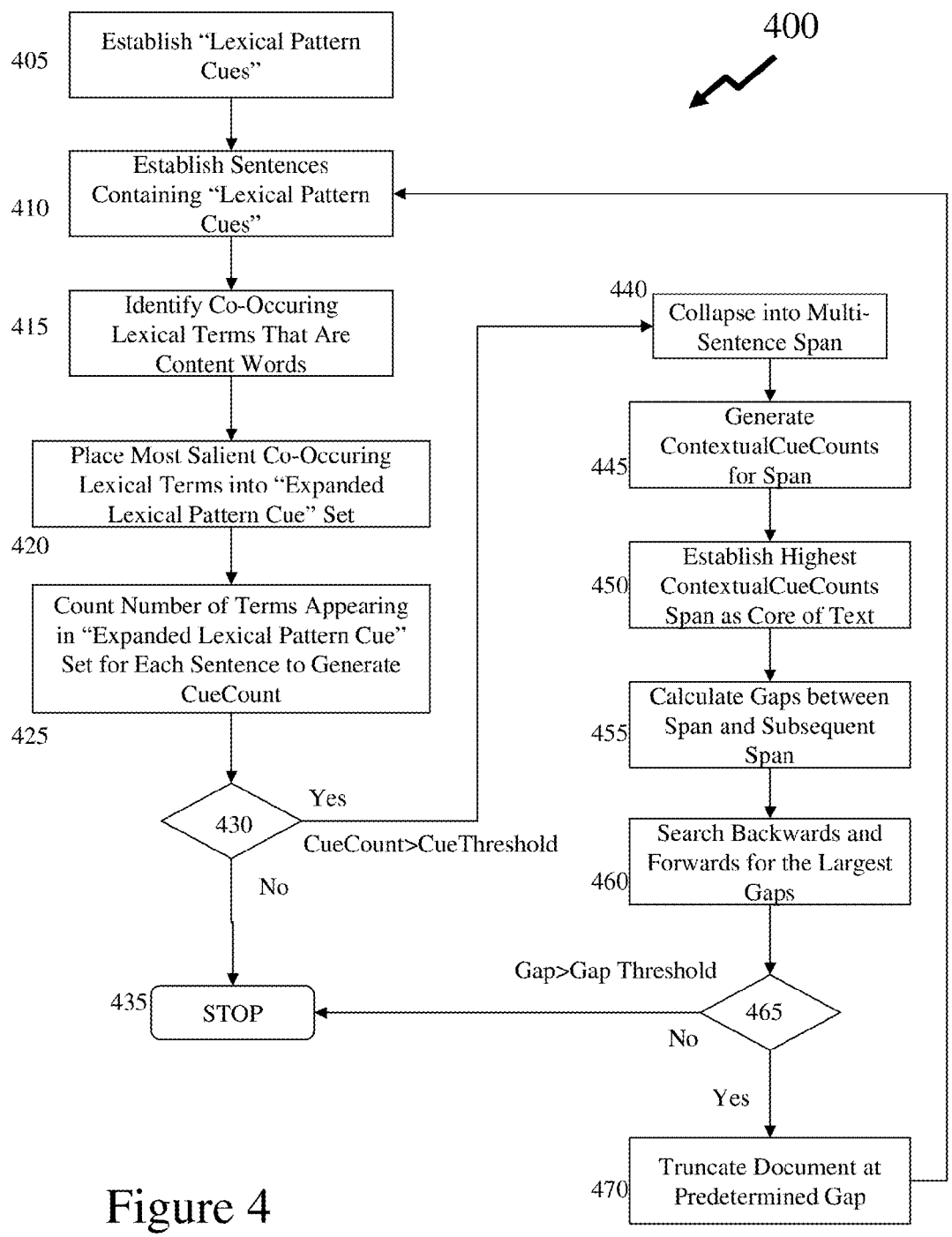
FIG. 4 depicts a process flow for cleaning an extracted content block to reduce non-lexical pattern content according to an embodiment of the invention.

Salient Content Filtering Process:

Referring to FIG. 4 there is depicted a process flowchart 400 according to an embodiment of the invention for cleaning an extracted content block to reduce non-lexical pattern content according to an embodiment of the invention. Flowchart 400 presents an optional additional step for cleaning the filtered block of content generated by process flowchart 2000 in FIG. 2B for example or another extracted block of content according to an embodiment of the invention. Accordingly, the process begins in step 405 with the establishment of a series of "lexical pattern cues", for example keywords, core multi-document concepts, headlines, etc. Then in step 410 a set of extracted content from one or more sources is searched to establish the sentences within each item of content of the set of extracted content and then within step 415 these are analysed to identify co-occurring lexical terms that are content words, and then in step 420 the process places the most salient of these into an "expanded lexical pattern cues" set. Then for each sentence the process counts the number of terms that appear in the "expanded lexical pattern cues" set, this being referred to as the sentence's CueCounts score.

Once all sentences have been processed then the process moves to step 430 wherein it is determined whether there are any CueCounts which exceed a CueThreshold value, which may for example be predetermined, be entered by the user, or established based upon previous analyses such as by the user. If the determination is negative the process proceeds to step 435 and stops otherwise it proceeds to step 440 wherein sentences that contain a non-zero CueCounts score are collapsed into multi-sentence spans. Each multi-sentence spans span is then associated with a ContextualCueCounts score in step 445 which is derived from the span's own CueCounts score plus a predetermined weighting of the CueCounts from the preceding and subsequent spans CueCount scores. Then in step 450 the span with the highest ContextualCueCounts is taken as the core of the text.

Then in step 455 the process calculates the gaps between each span and the subsequent span before in step 460 the process searches backwards and forwards for the largest gaps in each direction from the core text of the document. If a gap in either direction is above a predetermined threshold, determined in step 465, then the process moves to step 470 and the document is truncated at either or both of the earliest and latest gaps, thereby retaining that part of the document containing the core text. If the gap was not above the predetermined threshold then the process moves from step 465 to 435, the document is not trimmed, and the process stops. However, from step 470 after trimming the process loops back to step 410 and re-runs the process in the trimmed document and repeats as many times as necessary to trim the document. Optionally, the predetermined threshold value may be adjusted between iterations of left constant. Accordingly, process flowchart 400 allows for the salient content to be extracted from the core text of the document and for this salient core content to then be presented to the user with the extraneous content of the document removed.

Whilst flowchart 400 is discussed supra as providing an optional additional step for cleaning the filtered block of content generated by process flowchart 6000 it would be evident to one skilled in the art that the process described may be employed discretely to reduce the extraneous content of a document as easily as it may be employed in combination with another filtering and/or salient content extraction process. In the embodiments wherein the process is employed in conjunction with another filtering and/or salient content extraction process the "lexical pattern cues" which are established at the beginning of the process may be those associated with the other filtering and/or salient content extraction process. However, in those embodiments of the invention wherein the process is employed discretely then these "lexical pattern cues" may be derived from other sources, such as for example, direct user keyword entry, common elements of multi-document selected for processing such as file name, title, etc, a portion of a document highlighted by the user, user preferences, recent user history, a keyword or keywords employed in a search process.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   a) receiving an item of content;
   b) identifying within the item of content using a microprocessor a set of lexical pattern cues for core content of the item of content and selecting a segment of the item of content having a highest likelihood as being the core content based upon a structural analysis of the item of content in dependence upon at least the set of lexical pattern cues;
   c) parsing the item of content to generate a hierarchy of content within the item of content;
   d) ranking the hierarchy of content in dependence upon at least the lexical pattern cues and sorting the resulting ranking;
   e) identifying a gap when searching down the ranking meeting a predetermined threshold and removing those portions of the hierarchy of content below the gap to generate truncated content;
   f) finding all occurrences for portions of the hierarchy of content with closest match to the lexical pattern cues closest to the start of the item of content;
   g) determining whether multiple matches to the lexical pattern cues exist and establishing an action in dependence upon at least whether multiple matches exist or not;
   h) performing the action, wherein the action is at least one of:
      establishing the occurrence for the portion of the hierarchy of content as the core content of the item of content when the determination of multiple matches is negative; and
      establishing the occurrence for the portion of the hierarchy of content that at least one of contains the largest portion of the item of content and is the first occurrence as the core content of the item of content when the determination of multiple matches is positive.

2. The method according to claim 1 further comprising:
   i) establishing a truncation point within the remaining portion of the hierarchy of content, the truncation point being the start of trailing extraneous content established by semantic analysis of the truncated content; and
   j) removing that portion of the hierarchy of content after the truncation point from the truncated content.

3. The method according to claim 1, wherein the item of content is a web page and the hierarchy of content is a document object model tree.

4. The method according to claim 1 further comprising:
i) establishing a core topic relating to the core content;
j) assessing the next portions of the truncated content for cohesion with the core topic and discarding those that are not cohesive;
k) evaluating a retained portion of the truncated content to determine whether each portion stays related to the core content and truncating those portions that go off topic;
l) repeating steps (j) and (k) until all portions of the truncated content have been analysed;
m) storing remaining truncated content as final content.

5. The method according to claim 4 further comprising:
n) comparing the final content to any other occurrences of portions of the hierarchy of content matching the lexical pattern cues for a closer match than the current selection and selecting said if a closer match; and
o) storing the resulting active portion of the hierarchy of content in a database together with an association to the item of content.

6. The method according to claim 4 further comprising:
determining in step (1) whether a threshold is reached in terms of a rate of discarding and truncating portions of truncated content compared to assessing and evaluating them; and
removing all subsequent portions of truncated content when the threshold is reached.

7. The method according to claim 1 further comprising:
i) employing the location of final text within the hierarchy of content to describe a descriptive extraction pattern that can be employed to identify the final text in the hierarchy of content; and
j) storing this descriptive extraction pattern in association with a label that can identify the portion of the selected content in which the final text is found as it is located within the hierarchy of content.

8. The method according to claim 1 further comprising:
i) determining a confidence metric in dependence upon at least a comparison of the truncated text against the hierarchy of content; and
j) storing the confidence metric together with at least one of the item of content, a reference to the item of content, and the truncated content.

* * * * *